United States Patent
Hagen

[15] 3,673,658
[45] July 4, 1972

[54] STRUCTURAL STEEL CONVEYOR LINE

[72] Inventor: William Dobson Hagen, Beaconsfield, Quebec, Canada

[73] Assignee: Dominion Bridge Company Limited, Montreal, Quebec, Canada

[22] Filed: Feb. 1, 1971

[21] Appl. No.: 111,489

[30] Foreign Application Priority Data

Dec. 29, 1970 Canada..................................101665

[52] U.S. Cl..............................29/155 R, 29/200 A, 29/430
[51] Int. Cl. ....................................B23p 17/00, B23p 19/00
[58] Field of Search.................29/200 A, 430, 155 R, 208 D, 29/155 C

[56] References Cited

UNITED STATES PATENTS 3,543,374 12/1970 McConnell..........................29/200 A
3,546,772 12/1970 McConnell..............................29/430

*Primary Examiner*—Thomas H. Eager
*Attorney*—Fetherstonhaugh & Co.

[57] ABSTRACT

A production line for the fabrication of structural steel members including a storage area from which selected material is delivered to a selected conveyor of a pair by side transfer apparatus, adjustable gauge means alongside the conveyor for locating the material with respect to cutting apparatus for cutting the material to length on the conveyor, side transfer means for transferring the cut-to-length material from its conveyor to an intermediate conveyor, advancing the material on the intermediate conveyor through a shot blast zone, transferring selected material to another conveyor by side transfer means and advancing the selected material through a punch and drill unit, and advancing all of the material on the conveyors to a marshalling zone where all pertinent material and instructions are placed on the members before further advance and side traverse into selected work areas for final assembly of the material to form the structural steel members.

17 Claims, 13 Drawing Figures

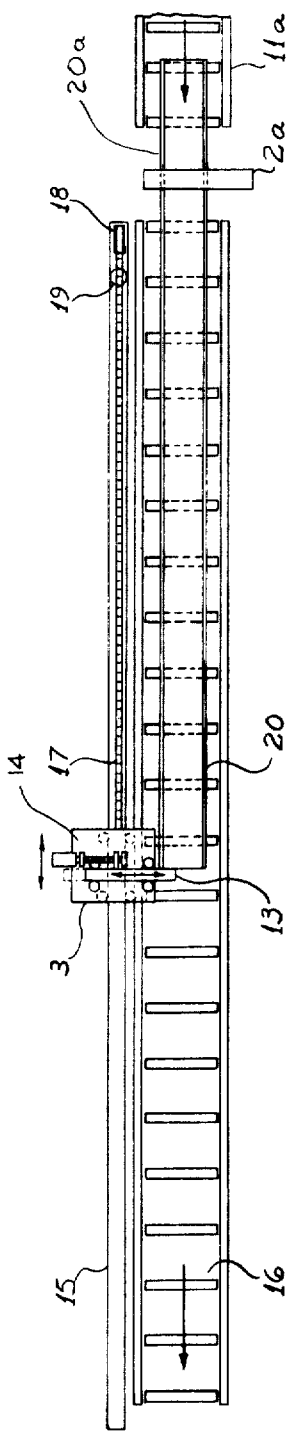
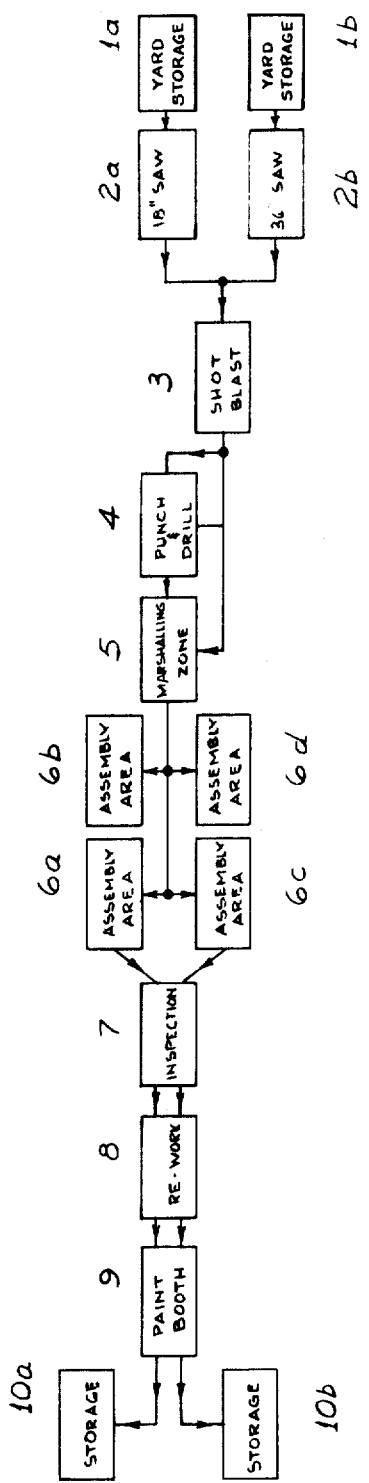
FIG. 4
FIG. 1
INVENTOR
W. D. HAGEN
Fetherstonhaugh & Co.
PATENT AGENTS

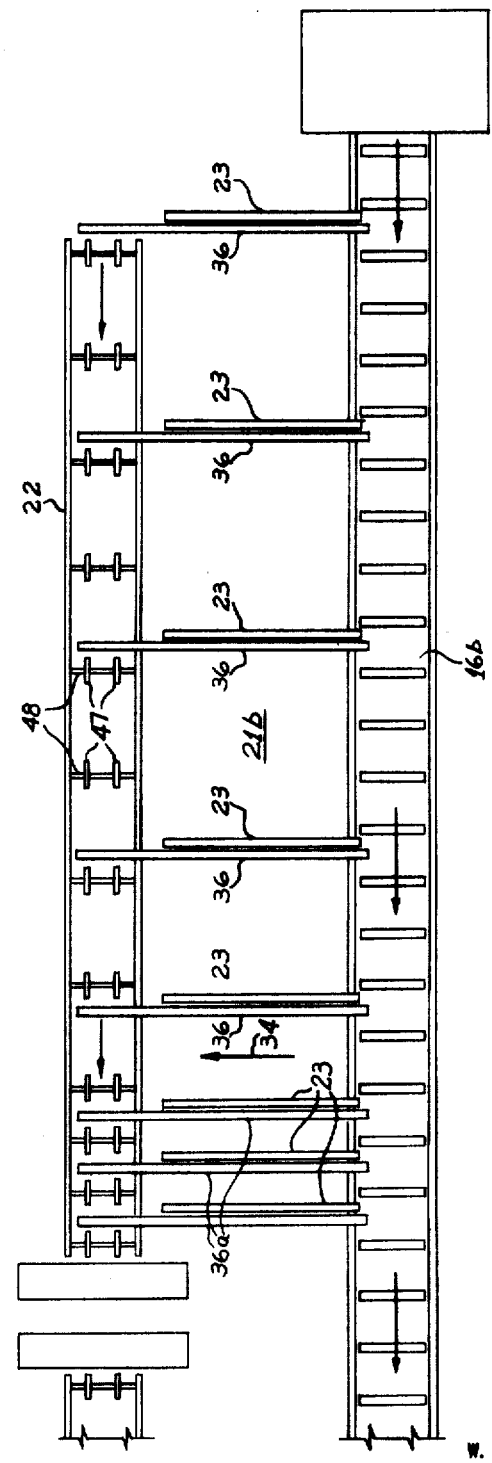

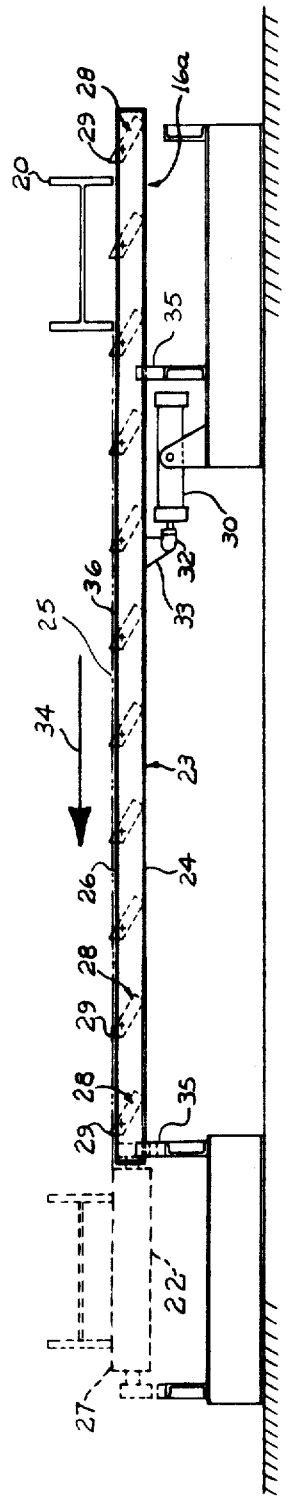
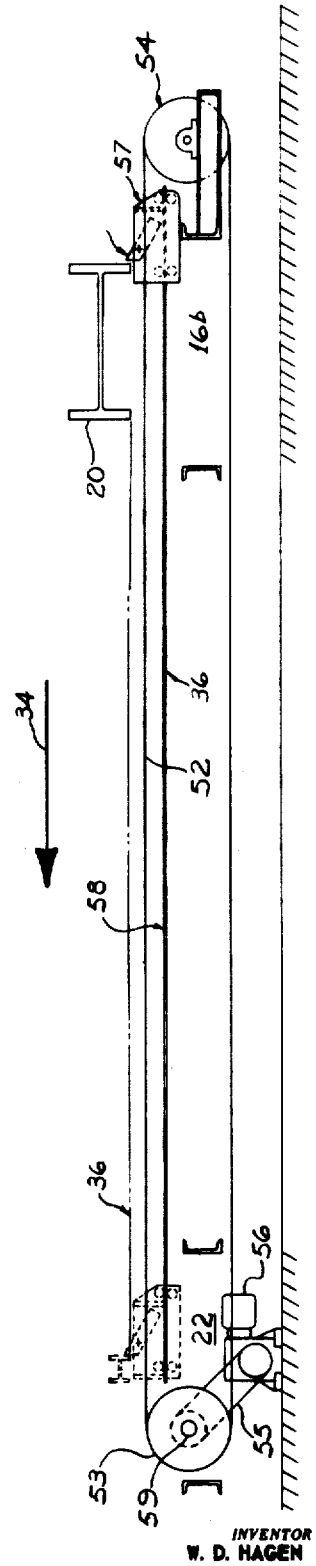

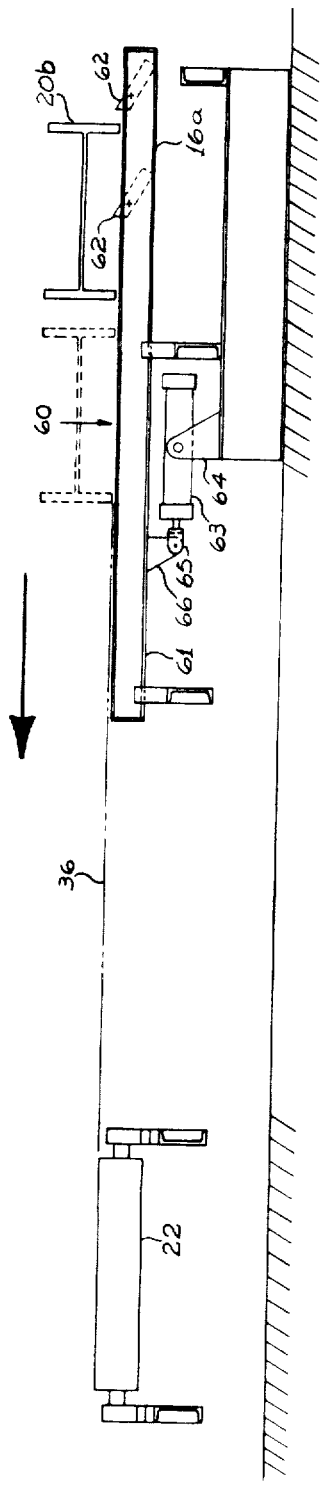
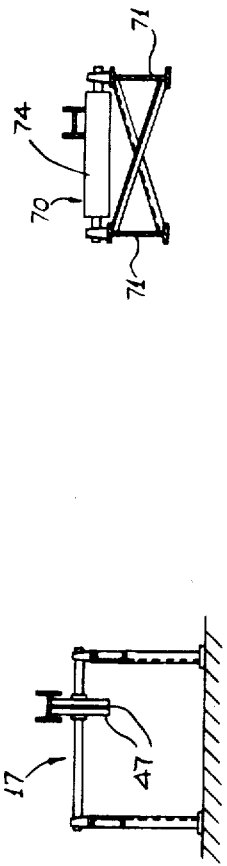
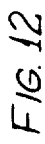
FIG. 7
FIG. 12
FIG. 13
INVENTOR
W. D. HAGEN
Fetherstonhaugh & Co.
PATENT AGENTS

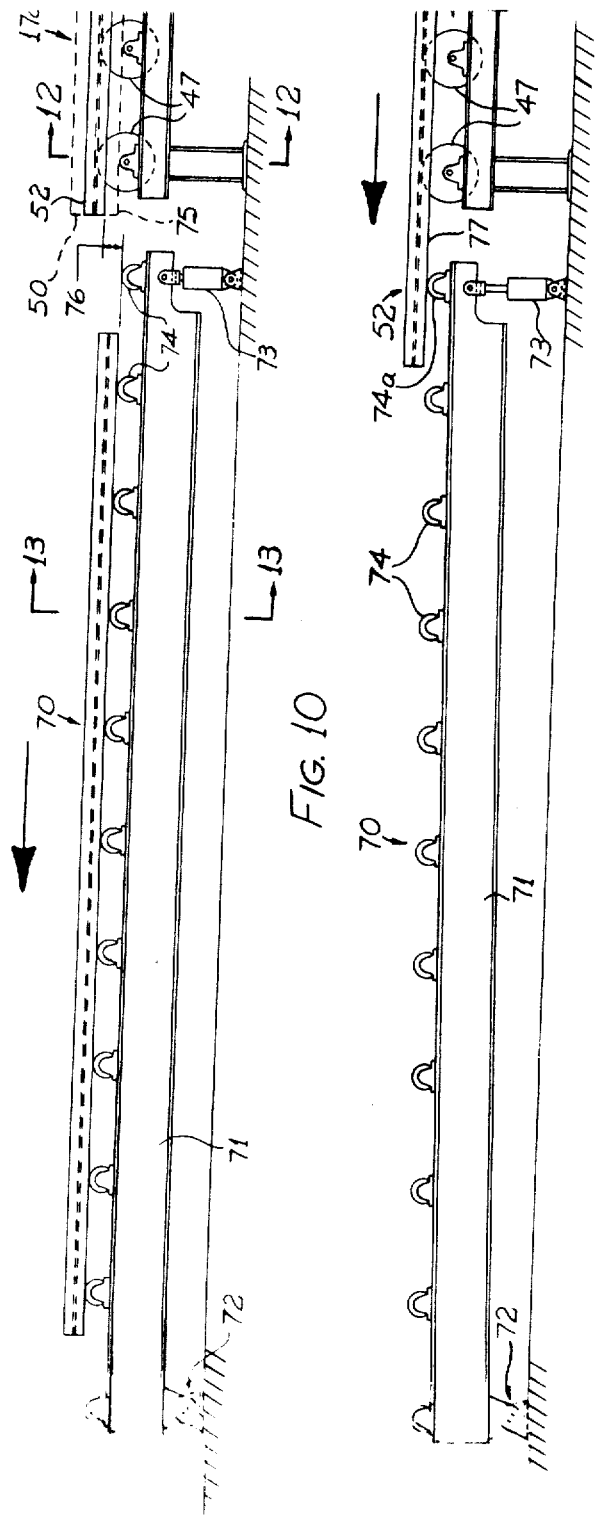

STRUCTURAL STEEL CONVEYOR LINE

This invention relates to the production of structural steel members used in the construction of buildings, bridges and other such structures.

Steels for buildings, bridges and general structures are normally termed structural steels. Such materials are purchased directly from the steel mill or warehouse in a variety of shapes and to any of numerous specifications limiting physical properties and chemistry of the material. The shapes most commonly purchased for structural fabrication are hot rolled beams, columns, angles, channels, bars and plates. These shapes are supplied in a great variety of sizes for depth, width and thickness to suit specific design requirements. Specifications to which the steels are rolled vary in minimum specified tensile strength over a wide range between mild steel and low alloy grades. The chemistry of the steels must be suitable for welding.

The mode of attachment of structural members together in the field is by means of bolting, welding, riveting or bearing in intimate contact or a combination of these methods. Regardless of the method of final strength attachment between members, a structure is usually assembled together in part by bolting, to the point where sufficient alignment and plumbing of members is assured before final connections are made. Bolts must pass through holes which are accurately aligned in any two members to be joined and consequently must be accurately located in all shop fabrication operations to position members in their correct relationship one to another. The ease with which a structure is assembled in the field depends more on shop fabrication accuracy than on any other factor.

Shop fabrication of the various members falls into distinct categories—preparation and fit-up. Preparation may involve operations such as template making, marking, shearing, burning, punching, drilling, shot blasting and facing of any component of a shipping member. Fit-up involves operations such as assembly, bolting, reaming, riveting, welding, arc-air gouging, grinding, etc. in joining the component parts of a member to be shipped into the field for erection of a structure. Integrating all of the operations into smooth flowing sequences requires very complete production planning and scheduling in order to produce an economical flow of material for each operation into the field to meet erection dates.

Material required for fabrication, on receipt from a mill or warehouse, is generally received in a yard serviced by rails, roads and overhead handling cranes for storage until needed. On receipt of orders or bills of material, selected stock is then collected in the yard and loaded onto lorries for issue into the shop. Within the shop materials are usually handled by means of overhead lifting equipment where stock is lifted from the lorries and deposited on the floor adjacent to machines or on skids. Stock material is usually long, heavy and cumbersome and in consequence, two men are normally required for hoisting conveying and placing. From the floor, individual stock pieces are handled singly onto skids for operations involving marking, burning, drilling or facing or onto rollers for operations involving shot blasting, shearing and spacer punching. When work at a skid or machine is completed, each heavy single piece is individually hoisted, conveyed and placed on the floor. Later a group of pieces is lifted from the floor and deposited on lorries for movement to another location. When several operations are necessary on the same piece of material such as shot blasting, shearing to length, punching or drilling, the handling sequence must be repeated at each machine. Such handling must be continued into the assembly end of the shop whenever the material is transferred onto skids for assembly, reaming and riveting, welding or for painting.

In existing structural fabrication shops, labor spent on handling amounts to a very considerable portion of the total labor costs. The ratio of handling to total labor varies conservatively between 25 percent and 50 percent.

It is, therefore, an object of the present invention to provide a novel system of mechanized conveyor and transfer equipment to be used in conjunction with standard or modified fabrication machinery to avoid intermediate handling from the time the material is first deposited from the stock yard until stored prior to shipping.

Shop fabricated structural steel takes a great variety of shapes and sizes and previous attempts to produce a solution to the problem have produced negative results. However, by proper division of structural materials into three main classes and by careful planning, fabricating lines have been developed which do produce decided economy in shop fabrication of structural steel.

In order to handle the wide range of structural shapes encountered in a steel fabrication shop, it is necessary, according to the present invention, to have three main lines of conveyors, transfers and production machines. These are a Beam and Column Line, an Angle Line and a Plate Line. All material from storage starts in or flows through one of these three Lines. Detail material sufficiently small to be conveniently manipulated by hand may exit from the Line, after cutting to size and handled in a normal manner for further processing.

The present invention provides a method of handling structural steel members of three differing categories; i.e. beam and column, angle and plate, by conveyor traversing the main structural members through various work areas for operations required in accordance with previously detailed instructions followed by adding component parts and assembly drawings in a marshalling station prior to distribution along a conveyor to designated work stations where the component parts are secured to the main members in the arrangement called for in the work instructions. The built-up assemblies are then passed further along the conveyors for inspection, re-work, painting and finally to a storage area to await assembly with other similar work assemblies or for shipment to a work site.

The following is a description by way of example of certain embodiments of the present invention, reference being had to the accompanying drawings in which -

FIG. 1 is a flow diagram of the beam and column line.

FIG. 3 is an enlarged plan view taken from FIG. 2 showing the relationship between the conveyors and transfer skids.

FIG. 4 is an enlarged plan view taken from FIG. 2 showing a gauge arm in relation to a conveyor for cutting-off.

FIG. 5 is a side elevation of an automatic take-off and transfer unit between conveyors in FIG. 2.

FIG. 6 is a side elevation similar to FIG. 5, but showing a manually operated take-off and transfer unit.

FIG. 7 is a side elevation of an automatic take-off unit from conveyor to storage skid in FIG. 2.

FIG. 10 is a longitudinal side elevation of a pivoted section of conveyor shown in a lowered position adjacent the end of a fixed level conveyor.

FIG. 11 is a view similar to FIG. 10, but showing the pivoted conveyor in the raised position.

FIG. 12 is a transverse section taken on the line A—A of FIG. 10.

FIG. 13 is a transverse section taken on the line B—B of FIG. 10.

Figure 2:
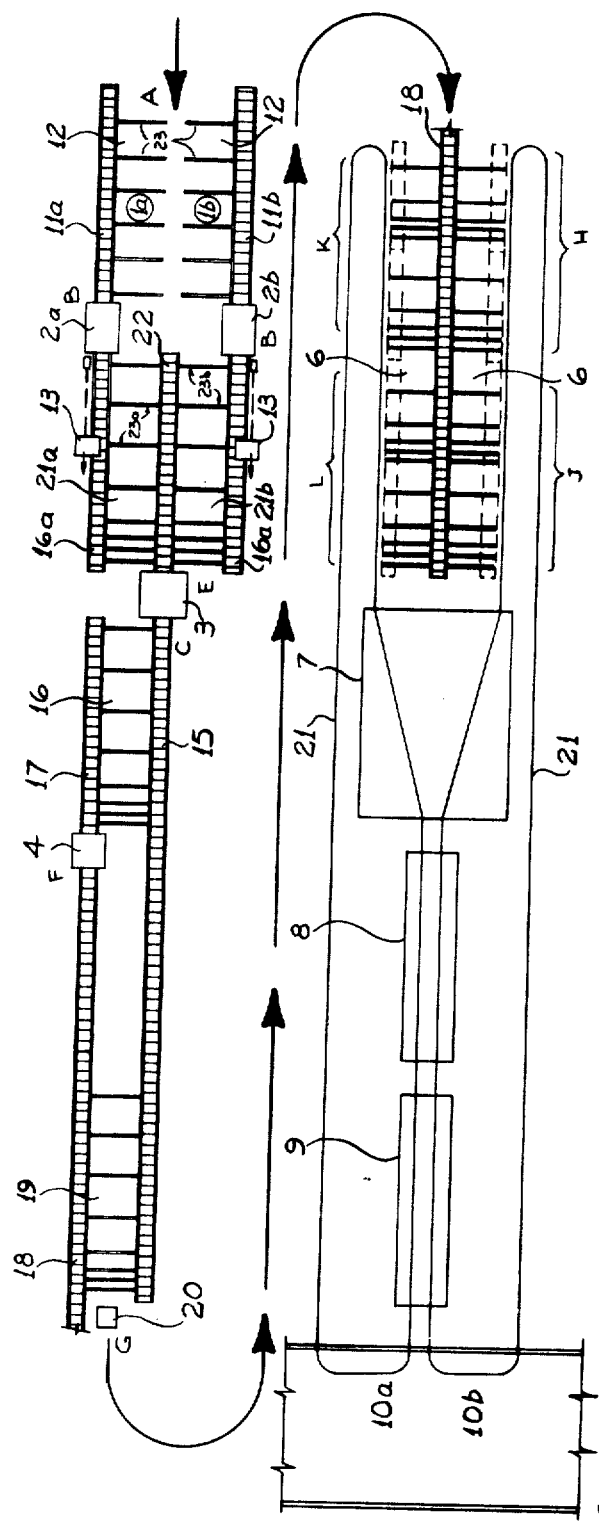
FIG. 2 is a key plan of the beam and column lines shown in FIG. 1.

Referring to the drawings and particularly to FIG. 1 which is a flow diagram illustrating the path taken by beams and columns to be worked on. The various stages in the flow diagram are identified as follows: yard storage 1a and 1b, cutting saws 2a and 2b, shot blasting 3, punch and drill 4, marshalling zone 5, assembly areas 6a, 6b, 6c and 6d, inspection 7, re-work 8, paint booth 9 and final storage areas 10.

Referring now to FIG. 2 which is a key plan of the flow diagram shown in FIG. 1, the conveyors 11a and 11b receive selected structural steel members from the yard storage 1a and 1b and are stored in the storage area 12 between the conveyors until required for processing. When required, individual structural members are taken from the storage area 12 and again deposited on the conveyors 11a and 11b and fed along past the cutting saws 2a and 2b until their forward end makes contact with the pre-positional gauging arms 13a and 13b set with respect to the cutting saws 2a and 2b which are then activated by the operator B to cut the structural members to the desired length.

A gauging arm 13 is shown in detail in FIG. 4 and consists of a powered carriage 14, running on the track 15 alongside the conveyor 16a or 16b. A measuring tape 17 is wound on the drum 18 and has its free end attached to the carriage 14. A tape reading point 19 is located at the position of the Operator B who controls the movement of the carriage 14 so as to position the gauge arm 13 at a precise position with respect to the cutting saw 2a for cutting of the structural member 20 to a precise length. The leftover portion 20a of the structural member 20 is retained in the storage area for future use.

After the structural member 20 is cut to length, it is transferred from its conveyor 16 to the storage areas 21a or 21b by means of any one of the apparatus shown in FIGS. 5, 6 or 7, whichever is best suited for the operation.

In FIG. 5 there is shown an automatic take-off and transfer unit 23 and is typical of a unit which can be used between one conveyor to another, say between conveyors 16a or 16b and the intermediate conveyor 22 shown in FIG. 2. The transfer unit 23 consists of a frame 24 whose top surface 25 is located at the level of the top surface 26 of the conveyors 16a and 22, and 16b and 22, in this case the top surface is preferably that provided by conveyor rollers 27.

The frame supports a series of hinged dogs 28, the end 29 of which project above the top surface 26 of the frame to engage with the structural member 20.

An air cylinder 30, mounted on the base 31 of the conveyor 16a has its piston rod 32 attached to the bracket 33 on the under side of the frame 24 so that on reciprocation of the piston rod 32, the frame 24 with its hinged dogs 28 reciprocates with the dogs 28 engaging the structural member 20 to cause its transfer off the conveyor 16a towards the conveyor 22. The hinged dogs 28 are so arranged on the frame as to engage with the structural member 20 when the frame moves in the direction of transfer indicated by the arrow 34, and pivot under the structural member when the frame moves in the opposite direction.

The frame 24 is supported for reciprocal movement in the guides 35 mounted on the frames of the conveyors 16a and 22.

Between pairs of transfer units 23, skids 36 support the structural members 20 on their top levelled surfaces. The bearing surfaces of the skids 36 are bars or rods of a material (such as high carbon steel) which has good wear resistance. These skids 36, between parallel lines of conveyors, such as 16a–22bq16b, provide the storage spaces 21a and 21b as seen in FIG. 2. The provision of such storage spaces is important since the rate of production at each operating machine or assembly station may vary by large elements of time.

A typical layout of storage space as at 21a and 21b is shown in FIG. 3. The transfer units 23 are indicated alongside the skids 36 and are located in pairs so as to support the shortest and longest length of structural member 20 likely to be cut and transported through the production line.

The length of the storage skids 36 is about 15 feet to permit adequate storage capacity. The spacing between skids is variable and, as shown in FIG. 3, the spacing varies from about 12 feet at the right hand end down through 10 feet, to 5 feet to 3 feet at the left hand end. The short spacing of the skids at the left hand end allows for the support of the shortest length of structural members, over 6 feet long, which may travel endwise along the conveyors.

Figure 8:
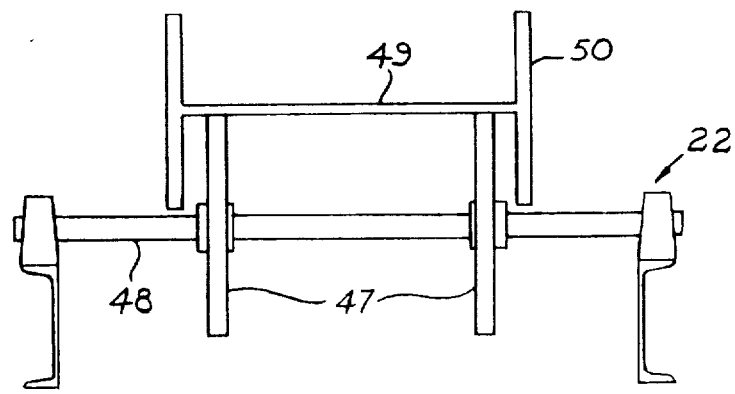
FIG. 8 is a vertical transverse section of one of the conveyors having adjustably spaced structural member web support rollers, spaced to support a large structural member.
Figure 9:
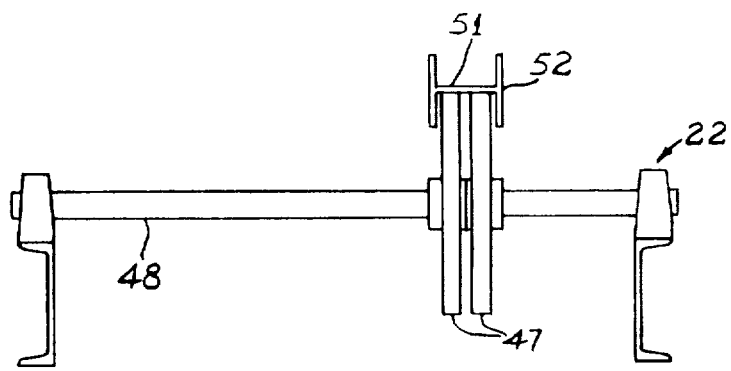
FIG. 9 is a view similar to FIG. 8, but showing the web support rollers adjusted to support a small structural member.

In the conveyor 22, as shown in FIG. 3, rollers 47 are mounted on transverse shafts 28 and are shown in detail in FIGS. 8 and 9. In FIG. 8 the rollers 47 are adjustably spaced on the shaft 48 in order to support the web 49 of the largest structural member 50 to be conveyed, whereas in FIG. 9 the rollers 47 are moved together on the shaft 48 to support the web 51 of the smallest structural member 52 to be conveyed.

In FIG. 6 there is shown an alternative means for transferring the structural member 20 from one conveyor to another. In this form there is shown a link belt 52 running over a power sprocket 53 and an idler sprocket 54. The power sprocket 53 is driven by the belt drive 55 from a reversible, push-button operated gear motor 56. The link belt 52 drives the carriage 57 for reciprocal movement on the carriage guide 58. The carriage 57 is provided with a hinged dog 59 for engaging with the structural member 20 to move the member across the skids 36 from the conveyor 16b to the conveyor 22. In certain storage areas, a series of the above described transfer units may be employed to transfer the structural members from one conveyor to the other, and these transfer units may be operatively connected together by a common torque shaft 59 on which the respective power sprockets 53 are mounted.

In order to clear the widest structural member 20, say a 36-inch beam, off the conveyor 16a or 16b, an air cylinder with a stroke in excess of 36 inches must be used, using one dog only. Control of the air supply to the cylinder 30 (FIG. 5) is necessary to produce one complete cycle of movement, i.e. an idle and a power stroke. Long cylinders are expensive, however, and it is possible to reduce the cost by using, say, a 24-inch stroke air cylinder controlled to automatically produce two complete cycles of a transfer unit using two dogs. Such a unit 60 is shown in FIG. 7 and is used to take-off the structural member 20a from the conveyor 16a or 16b and transfer the member to the skids 36. The frame 61 of this unit 60 is of relatively short length compared with the frame 23 shown in FIG. 5, and is provided with a pair only of hinged dogs 62 for engagement with the structural member 20b. The frame 61 is reciprocated by a short stroke (24 inch) air cylinder 63 mounted on the bracket 64 on the frame of the conveyor 16a, and its piston rod 65 is connected to the bracket 66 on the frame 61. The hinged dogs 62 may be spaced about 20 inches apart so that one or other of the pair will always engage with the structural member during the two cycle operation of the cylinder 63.

In the operation of the transfer unit 60, the first cycle of movement of the frame 61 causes sufficient sideways movement of the structural member 20a through the medium of one of the two dogs 62 to permit the second dog to complete the take-off movement of the structural member 20a on the second cycle of slide motion initiated by the air cylinder 63.

It is obvious that any structural members previously moved off the conveyor 16a onto the skids 36 may be simultaneously moved forward with each new addition to the number of pieces on the skids. However, the power transfer unit 60, shown in FIG. 7, would not normally push the leading structural member off the skids 36 onto the adjacent conveyor 22 when required by the next-in-line Operator. To do so, requires a second transfer unit operating to transfer the structural members from the skids and storage area onto the adjacent conveyor 22 under the control of the next-in-line Operator. This second transfer unit could be either of the types illustrated in FIGS. 5 or 6.

While the above apparatus has been described particularly with respect to the conveyors 16a, 16b and 22, it is to be understood that such apparatus can be associated with any combination of parallel conveyors and storage areas between them, as shown in FIG. 2.

Referring now to FIGS. 10, 11, 12 and 13, there is shown a pivoted section of the conveyor 17 leading to the punch and drills unit, or station 4 in FIG. 2, where a first section 17a is similar to that shown at 22 in FIGS. 3, 8 and 9. In FIGS. 8 and 9 respectively, there is shown large and small structural members 50 and 52 supported on rollers 47. It will also be noted that the section of the small structural member 52 is at a higher elevation than the section of the large structural member 50.

In order to bring both members 50 and 52 to rest on a uniform level surface, there is introduced immediately before the punch and drills station 4 in FIG. 2, a pivoted section of conveyor 70 consisting of conveyor side members 71, one end of which are pivotally mounted on the pivot support 72, while the opposite end adjacent the conveyor 17a is supported on hydraulic cylinder devices 73. In the retracted position of the device 73 (FIG. 10) the top surface of the rollers 74 are but slightly below the lower edges 75 of the flanges of the large structural member 50, thereby permitting the member 50 to be moved forward onto the rollers 74. However, the elevation of the smaller member 52 above the top of the rollers 74 is indicated at 76. In order to overcome this elevation, the cylinder device 73 is raised sufficiently to bring the top surface of the roller 74a adjacent the conveyor 17a to the level of the bottom edge 77 of the flanges of the smaller structural member 52, as shown in FIG. 11. The member 52 can be be moved forward onto the rollers 74, after which the cylinder device 73 is retracted to bring the conveyor back to the level position shown in FIG. 10 and so permit both large and small structural members to be moved forward at a uniform base level.

Having now described in detail the various mechanical devices required to ensure efficient operation of the system for handling the work pieces as they progress through the various stages shown in the flow diagram FIG. 1 and key plan FIG. 2, the operation of the system will now be given in detail.

STORAGE

Material held in the storage yards is collected as required by reason of order bills which specify material specification, type of member and sizes of order needed. Such material is lifted in bundles and deposited in the storage areas 12, adjacent to the first conveyors 11a and 11b.

It is a significant factor in economy of material that any piece of structural material left over from a previous contract and which will meet the requirements of the order bills, except for length, is placed on top of the bundle deposited in the storage areas 12. Such material is generally termed "shorts".

Operator A (FIG. 2) on receiving a bundle of members, then proceeds to distribute these members in a single layer on top of the transfer skids 23 in the storage areas 12. Any "short" is placed first in line.

CUTTING TO LENGTH

Operator B is in control of the first power operation, consisting of cutting material to specified length as shown on order bills. By means of an electric control console, controlling the cutting saws 2a and 2b, the first member in line may be moved off the transfer skids 23 onto the roller conveyors 11a or 11b leading into the saw house. Assuming that the size of the member differs from those members previously cut, the new member will be moved forward until it contacts a pre-set gauge arm 13, or, if too short, the trailing end is first sawn square and then moved forward into a clamping area. In the latter case, the exit conveyor 12a or 12b is stopped by the Operator B and the trailing end is clamped horizontally by powered jacks, not shown. The Operator then proceeds, as before, to move the next structural member off the transfer skids 23 onto the lead-in conveyor 11a or 11b. He then operates this portion of conveyor separately to bring the leading end of the member first into the saw vice where it is cut square and then into contact with the clamped member. In turn, the second member is also clamped to achieve horizontal alignment and a tight joint between abutting ends. Since structural shapes are not completely uniform in contour, means are also provided for vertical adjustment to align the webs. When rigidly secured and aligned, the joint is then securely tack welded by Operator B on the surface of two planes at right angles to one another to ensure maintenance of alignment at all stages in operation. The joint is later welded with full fusion and 100 percent strength. "Shorts" over 2 feet in length remaining after cutting each structural member are similarly joined to the succeeding member. Any structural member, or members joined as above, may then be advanced to the pre-set gauge arm 13 position. Gauging may be done in many ways but certain fundamental requirements are desirable.

The gauging arm 13 must be quickly and accurately positioned by power movements. Manual final adjustments may be desirable particularly in view of the fact that momentum of heavy structural members must be decelerated to avoid damage or shift in gauge position. Tapes 17 used for reading gauge position must be capable of being read by the operators B through the medium of magnifying glasses 19, reflector mirrors, etc. or by means of large dials. The gauge arm 13 must be power retracted to permit through travel of the cut member. All controls by the Operator B must entail a minimum of movement on the part of the operator to maintain highest rate of output.

When a member has been cut to length, the Operator B starts it on its way to the end of the exit conveyors 16a and 16b where the member is automatically shifted onto transfer-storage area 21a and 21b.

Any method of cutting to length at 2a and 2b may be used providing a reasonably square end surface results. Band saws, friction saws and cold saws are each capable of producing the required results when properly set up and operated. It is quite desirable to use two similar machines of different capacity to maintain sufficient output in the whole line. Thus two band saws, one with a capacity of 18 inches and the other with a capacity of 36 inches, work well in combination. Each unit, of course, requires separate runways and separate input and output transfers, and the final output transfers from both, must end adjacent to a common conveyor 22 into the next machine operation.

CLEANING

Operator E on the next operation controls shot blast cleaning of material. Due to the short overall time in expediting material through the line, it is quite feasible to power blast the material clean without an excessive time interval before painting. Clean material promotes an "orderly house" by eliminating the mill scale residue which otherwise gradually accumulates. Bearings or conveyors last longer and welding is improved by reason of scale removal.

All material moving towards the shot blast cabinet 3 on the conveyor 22 carries a contract and piece identification number marked on its leading end by Operator B. It is, of course, imperative to preserve this identification and to this purpose, Operator E covers the mark area with a small cover plate maintained in position by means of an integral spring clip. Operator E removes this cover as the members emerge from the blast chamber 3 on the conveyor 22.

By remote control, Operator E selects the leading structural member from one of the two preceding transfer-storage skids 23a and 23b. Again by remote control, he is enabled to advance the member at high speed on the conveyor 22 up to the point of entry into the blast chamber 3 when the speed is automatically reduced consistent with satisfactory cleaning. Single file passage of material through the blast chamber 3 is consistent with the timing for other operations, consequently, in the interests of econOmy, the chamber need only to be wide enough to accommodate a 36 inch beam. When the member has fully emerged from the blast chamber 3, the operator is required to invert some shapes in order to remove blast particles resting in the members.

The mark of the member and drawings then informs Operator C of the direction in which he must discharge the blast cleaned member. If no holes are required in the member, it is merely run along the exit conveyor 15 until automatically discharged onto transfer-storage skids 19. If holes are required in the member, it may instead be discharged sideways onto another set of transfer-storage skids 16, these latter being the storage ahead of a punching and drill operation 4.

PUNCHING AND DRILLING

Punching of structural shapes such as beams, light columns, and channels involves three separate spacing and punching traverses through the punch, one traverse for each flange and one traverse for the web. Due to the fact that punching is performed while each surface is horizontal, a member must be rotated and positioned for each traverse. Two men are required, because of the manual manipulation necessary, and straight forward flow of the fabricating line is interrupted. In order to offset the disadvantages of punching only in producing connection holes, a combination of punching and drilling is desirable.

A punch and drill combination 4 will permit members to proceed in a continuous forward direction from the preceding storage skids 16 and conveyor 17 to the next subsequent operation without the necessity of back traversing. One operator only can perform the necessary work.

The punch may be a standard machine having sufficient width to accept a 36-inch beam with the web in a horizontal position. Standard gauging equipment for punch selection must be conveniently located for control by Operator F. Spacing equipment may be one of several available types on the market providing that it can be controlled conveniently, accurately and quickly by the Operator F located in a fixed position and permits through traverse beyond the gauge or clamp arms and is power operated.

Drilling equipment must be of special design, built for this particular operation. Such equipment is the subject of a copending application, Ser. No. 52,427, filed May 23, 1969. Two means of measurement for hole spacing must therefore be provided, one for the web in punching and one for the flanges in drilling. Punching or drilling would then occur in the sequence shown on the appropriate material drawings.

A combination of two drills is planned for this operation, one of each flange. They must be capable of horizontal adjustment to accept a full range of structural material sizes up to 36 inches deep. They must also be capable of vertical adjustment for precise hole spacing with respect to the horizontal centerline of the web.

Operator F of this equipment must first transfer the leading structural member stored on skids 16 onto the conveyor 17 of the punch-drill machine 4. Members stored on the conveyor rest on their flanges. Members supported on the punch-drill conveyor must rest on their webs on sets of two or more narrow wheels capable of sideways adjustment to suit structural members having variable in-to-in flange measurements, i.e. between opposing flanges.

There are numerous means of accomplishing this sideways transfer from skids to runway. In the simplest manner, Operator F would move an overhead hoist to the mid-length of the structural member, attach clamps and make the transfer. Alternately, Operator F from a fixed location could manipulate an overhead hoist with magnets and power movements to effect the transfer. Again somewhat complicated automated devices could be developed. The choice of one would depend on the personal preference of the owner.

During the operation of punching and drilling, the structural member must be supported on its web until the longest length of 60 feet is clear of the drills, for this purpose the conveyors 17 and 18 may be of the type shown in FIGS. 3, 8 and 9.

MARSHALLING ZONE

Operator G functions in the marshalling zone 6. There are two available sources of supply of main structural members, one from transfer-storage skids 19 (at end of shot blast conveyor 18), the other from the punch-drill conveyor 15. Movement of members from the storage skids 19 is standard, as previously explained. Movement on the punch-drill runway must involve, however, a change in the type of support from the web support wheels to flange supporting rollers. This is accomplished by means of a pivoted section of the roller conveyor 18, which under power, permits Operator G to change support of the member from web wheels to flange rollers, as shown in detail in FIGS. 10 and 11.

As mentioned previously, each structural member has a contract and piece mark placed on it by the saw-operator. Operator G determines from this identification marking, the corresponding drawing relating to the member. It is then possible to select from a storage area 19 all the component pieces, which are required for final attachment to the structural member.

Wherever possible, standard components are planned in the original design and are shown on the drawing. They are stored in the marshalling zone 6 in marked bins so that this type of material is always ready. Components other than standard must be scheduled in a normal manner to be waiting in the marshalling zone 6 prior to arrival of the corresponding main structural member.

When selection of components has been made, these and the drawing are placed on the main structural member. When more than one identical member is to be fabricated, the drawing will serve for those following the first member.

Operator G now decides on a fabricating skid area H.J.K.L. most suitable for delivery of each structural main member. To effect such delivery there is under his control an electrical control console or cabinet which produces movement of members into and beyond the marshalling zone. Thus with the turn of a knob and the push of a button, a member with drawing and components moves under power to a specific location where the leading end of the member actuates a limit switch. The drive motor then becomes de-energized and the member is transferred off the roller conveyor 18 onto the adjacent fabricating skids 6.

ASSEMBLY AND FABRICATION SKIDS

For the fabricating line described thus far, eight fabricating bays H.J.K.L. are desirable to keep pace with production. These may be in a continuous line but ideally, a more compact line results with four skids on each side of the roller feed 18.

In the latter case, a hinged striker plate, not shown, in the roller conveyor 18 opposite to each pair of skids actuates two limit switches, also not shown. Any one of the eight limit switches may be energized at the will of Operator G and this determines at which pair of bays H.J. or K.L. a member is halted on the runway and to which side it will be transferred. Transfer to the skids 6 in this location may be performed solely by the Line Drive mechanism described earlier in relation to FIGS. 5, 6 and 7. On signal from the striker plate, the Link Drive will traverse the hinged dog under the structural member then return to a fixed position to clear the runway.

Each bay H.J.K.L. has a horizontal surface width of 9 or 10 feet, sufficient to normally store several members at one time. Beyond the horizontal surface, each skid member slopes 9 inches to 12 inches in 2 feet of length. Beyond the slope, at the lower elevation, a further 4 feet of skids provides a working area for one operator.

Each of the fabricating skid operators, in bays H to L included, may advance a group of members on his particular skid area until the leading member is on the skids. This is done by maintained contact of a push button, controlling the Link Drive returns to normal position with the dogs just clear of the roller conveyor.

An operator is then ready to work. All material and drawings accompany the main member. In addition, each operator has a complete selection of working tools—welding machine, burning torch, portable grinder, several compressed air outlets, jigs, etc. The operator performs many functions including layout, marking, burning, grinding, arc air gouging, assembly and welding.

Due to the fact that each operator normally works alone, it is here that standardization of detail really pays off for corresponding to each standard component, there is a suitable small portable jig which supports the detail piece in correct relationship to the main member for tacking followed by welding.

The length of each assembly and welding skid 6 is ideally 32 feet. When main members have a length greater than this dimension, it is necessary to utilize two adjacent skid areas for storage and later for welding. In such a case, two operators may simultaneously work on the same piece.

Butt joints between two members comprising a full length member as tacked originally by the saw Operator B are here welded for full strength. Proper sequence use of arc air gouging and welding produces full fusion without appreciable change in length or alignment of member.

Overhead handling equipment is essential at each skid. This permits an operator to successively turn heavy members into the most convenient position for performing all necessary work. In addition, detail members welded to the main member may project in any direction beyond the contour of the member and prevent any further transfer by roller conveyors. When a member is completely fabricated, it is then handled by the overhead hoists for dispersal on the monorail by the operator.

INSPECTION AND RE-WORK

Completed structural members may then be placed on shop lorries or suspended on supports from the monorail 21. In either case, inspection may be performed by one or more inspector to ensure that accuracy and quality has been obtained. If some errors were to appear, simple repairs may be made in position. In more serious cases, the member may require unloading for repair at the re-work location 8.

PAINTING

Painting members while on lorries or on paint skids does not merit any consideration in this application. The use of monorails 21, however, does provide a convenient traversing mechanism which is in agreement with the theme of the whole line, i.e. reduction of handling to a minimum. Thus monorails 21 converging together from the two sides of the assembly skid area 6 permit passage through a paint booth where all surfaces of a structural member are accessible for spray painting.

STORAGE PRIOR TO SHIPPING

Monorails 21 emerging from the paint booth may run into an area covered by an overhead crane for storage. The monorail may make a continuous loop for return of monorail carriages back to the assembly and fabricating areas 6.

The embodiments of the invention in which an exclusive property or privilege is claimed are defined as follows:

1. A method for the continuous fabrication of structural steel units on a production conveyor line comprising the step of:
   a. selecting feeding individual beam and column stock, together with detailed step by step work instructions, onto the conveyor line and to a first work station for cutting to length, shaping and drilling of the stock in accordance with the accompanying work instructions;
   b. side transferring the worked-on stock to storage areas alongside the production conveyor line;
   c. transferring selected items of worked-on stock from the storage area onto the conveyor line and to a second work station and thereat joining the selected items to form basic structural units;
   d. transferring the basic units on a conveyor line to a third work station;
   e. selecting small finished work pieces from storage as designated in the work instructions and securing the said finished work pieces to the said basic units to complete the structural steel units, and
   f. transferring the complete structural steel units from the last mentioned work area to a conveyor and to an inspection area for inspection in accordance with the accompanying work instructions.

2. A method for the continuous fabrication of structural steel units on a production conveyor line comprising the step of:
   a. selectively feeding individual beam and column stock, together with detailed step by step work instructions, onto a conveyor line and to a first work station for cutting to length, shaping and drilling of the stock in accordance with the accompanying work instructions;
   b. feeding plate stock onto a conveyor line and to a first work station for cutting, shaping and drilling in accordance with accompanying work instructions;
   c. side transferring the worked-on stock from (a) to (b) to a storage area alongside the production conveyor line;
   d. transferring selected items of worked-on stock from said latter storage area onto the conveyor line and to a second work station and thereat joining the selected items to form basic structural units;
   e. transferring the basic structural units to a conveyor line to a third work station;
   f. selecting small finished work pieces from storage as called for in the work instructions and securing the said finished work pieces to the said basic structural units to complete the structural steel units, and
   g. transferring the complete structural steel units from the last mentioned work area to a conveyor and to an inspection area for inspection in accordance with the accompanying work instructions.

3. A production line for the fabrication of structural steel units in combination with a master work instruction accompanying the work through the production line comprising one or more conveyor lines receiving heavy steel structural members from a storage area, means to cut and shape the heavy structural members to a size and shape dictated by the master work instruction, means to surface treat the sized and shaped structural members during their forward movement on the conveyor line, means to drill or punch the said structural members, means to assemble selected structural members together to form a basic structural steel unit, as called for in the accompanying master work instruction, a series of storage areas alongside the said conveyor line, the said storage areas containing an assortment of small structural members onto the conveyor line, and means to secure the said small structural members to the said basic structural steel unit to complete the unit as called for in the master work instruction, and discharging the completed structural steel unit from the conveyor line.

4. A production line as set forth in claim 3 in which there are at least two conveyor lines carrying heavy steel structural members from a storage area, and side transfer units carry structural steel members from a first conveyor line to a second conveyor line after the members are drilled or punched, and means to place the structural steel members from the second conveyor line into a predetermined position with respect to the structural steel member on the first conveyor line for joining the members together to form the basic structural steel unit.

5. Apparatus for the continuous fabrication of structural steel units comprising first storage skids, one or more first conveyors alongside the said first storage skids, means to transfer selected structural steel units from the said first storage skids to a selected first conveyor, a cutting saw located intermediate the length of each of said conveyors, a gauging arm located adjacent each of said conveyors beyond said cutting saws, said gauging arms being measurably adjustable along the said conveyor beyond the said cutting saws, the said first conveyors adapted to advance the said structural steel units into contact with said gauging arm for cutting the units to a predetermined length by the said saw, means to transfer the cut-to-length units onto second storage skids and to a second conveyor, a shot blast house through which said second conveyor passes, a third storage skids alongside said second conveyor beyond said shot blast house, a third conveyor spaced from and parallel with the portion of said second conveyor located beyond said shot blast house, a punch and drill unit located over said third conveyor beyond said third storage skids, a fourth storage skids between said second and third conveyors beyond said punch and drill unit, and marshalling and work areas into which the said third conveyor extends, the said marshalling and work areas including a fourth structural steel unit storage skids, means to assemble parts for attachment to the structural steel units deposited on said fourth storage skids, and conveyor means to remove the worked-on structural storage units from the said marshalling and work areas.

6. Apparatus as set forth in claim 5 in which the said means to transfer selected structural steel units from first storage skids to first conveyors comprise reciprocating members, and pivoted dogs on said reciprocating members, the said pivoted dogs engaging with the structural steel units to move the said units in one direction off the said storage skids and onto the said first conveyor.

7. Apparatus as set forth in claim 5 in which the said means to transfer structural steel units between adjacent parallel conveyors and over storage skids comprises reciprocating members, a series of pivoted dogs on said reciprocating members, with the said pivoted dogs engaging with the structural steel unit to move the said unit along the reciprocating member and the storage skids in one direction from one of the parallel conveyors to the other.

8. Apparatus as set forth in claim 7 in which the storage skids are located at spaced intervals lengthwise in the space between conveyors and bridging the space therebetween, and the said reciprocating transfer means are located one alongside each of said storage skids.

9. Apparatus as set forth in claim 7 in which the said reciprocating transfer means include a frame, a fixedly mounted cylinder and piston device, and connecting means between the piston of said cylinder and piston device and the said frame, the said cylinder and piston device being operable to reciprocate the said frame and dogs to progressively advance the structural steel unit along the said frame.

10. Apparatus as set forth in claim 7 in which the said reciprocating members are mounted in guides on the said parallel conveyors and are reciprocated into spaces between supporting rollers of the said parallel conveyors.

11. Apparatus as set forth in claim 7 in which the said reciprocating transfer means include a frame mounted for reciprocating movement transversely of one of said parallel conveyors, a fixedly mounted cylinder and piston device, connecting means between the piston of said cylinder and piston device and the said frame, the said cylinder and piston device being operable to reciprocate the said frame and dogs to progressively advance the structural steel units off the said one parallel conveyor and onto said storage skids and onto the other one of said parallel conveyors.

12. Apparatus as set forth in claim 7 in which the said means to transfer the structural steel units between conveyors and over storage skids comprises a series of continuous belt units located at spaced intervals lengthwise of the conveyors, a carriage on each of said belt units, and a pivoted dog on each of said carriages, the said pivoted dog adapted to engage the structural steel units to move the said structural steel units in one direction from one conveyor and over said storage skids to the other conveyor, and drive means for said belt units.

13. Apparatus as set forth in claim 5 in which the said gauging arms comprise a carriage movable on a track located alongside the conveyor, a spring-loaded measuring tape reel fixed on said track adjacent to said cutting saw, with the free end of the measuring tape being secured to the said carriage, and a reciprocating stop arm on the said carriage adapted to be moved over the said conveyor to stop an advancing structural steel unit at a predetermined distance in advance of the said cutting saw.

14. Apparatus as set forth in claim 13 in which a reading dial is disposed over the said measuring tape adjacent the tape reel, the said reading dial indicating the distance between the said stop arm and the cutting saw.

15. Apparatus as set forth in claim 5 in which at least some of the conveyors consist of a series of pairs of rollers, journalled in side members of the conveyors, each pair of rollers being adjustable relative to each other to support on their periphery various sizes of structural steel units.

16. Apparatus as set forth in claim 15 in which one length of conveyor, ahead of the conveyor having pairs of rollers, is pivotally mounted at the end thereof remote from said latter conveyor and the end of the conveyor remote from its pivotal mounting is supported on hydraulic jacks, the said hydraulic jacks being adjustable vertically to bring the end of the conveyor to a level coincident with the lowermost edge of the structural steel member supported on the pairs of rollers on the adjacent conveyor.

17. Apparatus as set forth in claim 5 in which the said marshalling and work areas consist of the said third conveyor and the said fourth structural steel storage skids are located on either side of third conveyor, the said latter storage skids including reciprocating members each having pivoted dogs and means to reciprocate the said members for movement of the structural steel units from the said third conveyor onto the said fourth structural steel storage skids.

* * * * *